United States Patent [19]

Sumner

[11] 4,076,130
[45] Feb. 28, 1978

[54] APPARATUS FOR MOUNTING A COUPLING MEMBER OVER A PIPE END IN A SUBSEA LOCATION

[75] Inventor: Glen R. Sumner, Houston, Tex.
[73] Assignee: HydroTech International, Inc., Houston, Tex.
[21] Appl. No.: 662,268
[22] Filed: Feb. 27, 1976
(Under 37 CFR 1.47)
[51] Int. Cl.² ............................................ B23K 37/04
[52] U.S. Cl. .................................. 214/1 PA; 29/781; 61/111
[58] Field of Search .................... 214/1 R, 1 P, 1 PA; 61/107, 110, 111; 294/74

[56] References Cited

U.S. PATENT DOCUMENTS

| | | | |
|---|---|---|---|
| 3,191,787 | 6/1965 | Stearn | 294/74 X |
| 3,204,417 | 9/1965 | Robley | 61/111 |
| 3,253,851 | 5/1966 | Gilbert | 294/74 X |
| 3,267,682 | 8/1966 | Robley | 61/111 |
| 3,657,786 | 4/1972 | Wiswell | 214/1 PA X |
| 3,658,231 | 4/1972 | Gilman | 29/200 P X |
| 3,785,160 | 1/1974 | Banjavich et al. | 61/111 |

Primary Examiner—Frank E. Werner

[57] ABSTRACT

Apparatus and method for mounting a coupling member over the end of a pipe in a subsea location where the pipe is being supported in cantilevered fashion. The apparatus includes a frame arranged for lowering to and mounting generally adjacent the pipe end and with the frame supported on the seabottom. It includes a beam connected to the frame arranged to extend generally longitudinally over the pipe for supporting the coupling member. A carriage is mounted on the support means for longitudinal travel thereon. The carriage has connection means for holding the coupling member therebelow. The apparatus includes means for raising and lowering the coupling member relative to the frame and the pipe. Power means are also provided for moving the support beam transversely relative to the frame and the pipe and for moving the carriage means on the support means longitudinally relative to the frame and pipe, whereby the frame and coupling can be lowered in a body of water until the frame contacts the seabottom and said coupling member may be brought into coaxial alignment with and passed over the end of the pipe.

4 Claims, 4 Drawing Figures

APPARATUS FOR MOUNTING A COUPLING MEMBER OVER A PIPE END IN A SUBSEA LOCATION

BACKGROUND OF THE INVENTION (a) Field of the Invention

The apparatus of this invention relates to the underwater coupling of pipes. More particularly, it relates to apparatus for coaxially mounting a coupling member over the end of a pipe end in a subsea location, which coupling member may then be used to interconnect an axially spaced apart pipe, for example.

(b) Description of the Prior Art

Various apparatus have been developed to manipulate the ends of pipes in an underwater environment so that pipe couplings previously mounted on the pipe ends could be moved to the interconnecting position. However, these prior art methods and apparatus, for the most part, have utilized extremely large, expensive and difficult to operate underwater frames, some of which included an underwater habitat. These prior art frames were generally placed over the ends of two pipes which necessarily have to be in relatively straight axial alignment. If there is a deviation between the two pipe ends and it is of a large magnitude, then such frames are not adapted to bring the same into proper alignment so that the pipe couplings could be moved to the coupling position. Moreover, such frames usually have to be suspended or have supported therein the connecting member which is to be used to complete the connection since the frame was generally unitary and was arranged to contact and manipulate both pipe ends. Such frames provided no space between the support points of the two pipes in which another tool such as that disclosed hereinafter could be used to mount the coupling member over the end of one of the pipes.

SUMMARY OF THE INVENTION

It is, therefore, an object of this invention to provide an improved apparatus and method for mounting a coupling member over a pipe end in a subsea location.

Briefly stated, the apparatus of this invention includes a frame arranged for lowering to and mounting generally adjacent the pipe end and arranged such that it is supported on the seabottom. Support means are connected to the frame and are arranged to extend generally longitudinally over the pipe for supporting the coupling member. Carriage means are mounted on the support means for longitudinal travel thereon. The carriage means has connected thereto means for holding the coupling member therebelow. The apparatus includes means for raising and lowering the coupling member relative to the frame and the pipe. Means are also provided for moving the support means transversely relative to the frame and the pipe. Further, means are provided for moving the carriage means longitudinally on the support means and relative to the framed pipe, whereby the frame and the coupling can be lowered in the body of water until the frame contacts the seabottom and said coupling member may be brought into coaxial alignment with and passed over the end of the pipe. One form of support means is an elongated support beam. The apparatus preferably includes alignment means connected to one end of the beam for contacting the pipe and spacing the beam a predetermined distance therefrom and with the raising and lowering means including means connected between the frame and the beam for raising and lowering the beam while said coupling member is supported thereby. Further preferred and novel characteristics and elements of the apparatus will be described in connection with the general description to be given hereinafter.

Briefly stated, the method of this invention contemplates mounting a coupling member coaxially over the end of a length of pipe in a subsea location and includes, in combination, the steps of supporting the end of said pipe in cantilevered fashion off the seabottom. A coupling member is then suspended from a single support point which may be provided by an elongated support beam, with the central axis of said coupling member being generally parallel with the beam. The support beam is mounted over the pipe end in generally parallel alignment therewith, after which the coupling member is moved to a position coaxially over the pipe end while the weight of the coupling member is being supported by a single connection by the beam. Preferably, the coupling member is suspended from the beam by making a single weight bearing connection therebetween, which connection is located at the balance point of the coupling member, which facilitates maneuvering of the pipe coupling, as will be described hereinafter. Further novel elements and details of the method will be explained hereinafter.

DESCRIPTION OF THE PREFERRED EMBODIMENT

Figure 1:
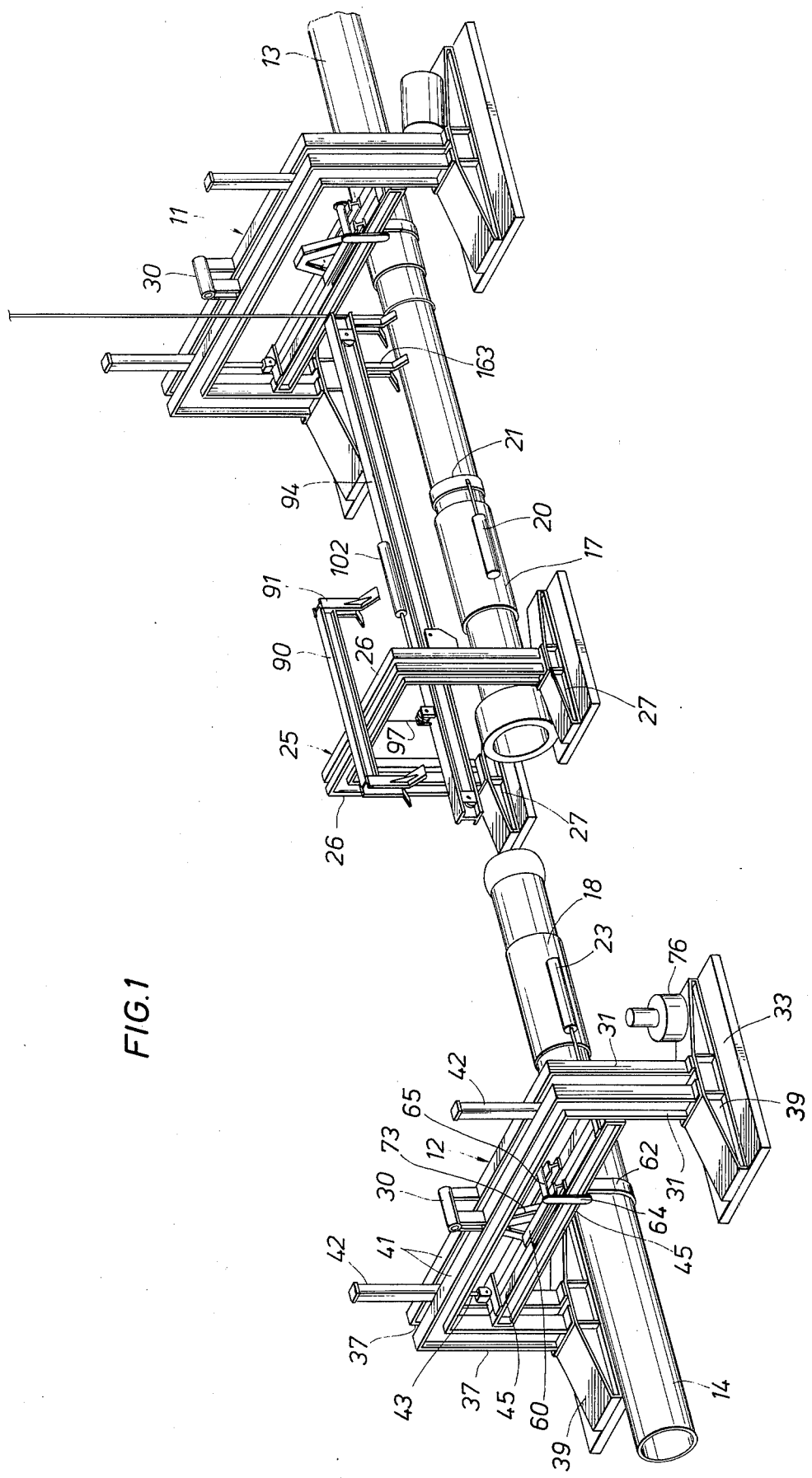
FIG. 1 is a schematic view showing apparatus for supporting the pipe ends (which is not part of the invention of this application) and apparatus for mounting a coupling member over one of the pipe ends in a subsea environment, which is the invention of this application.
Figure 2:
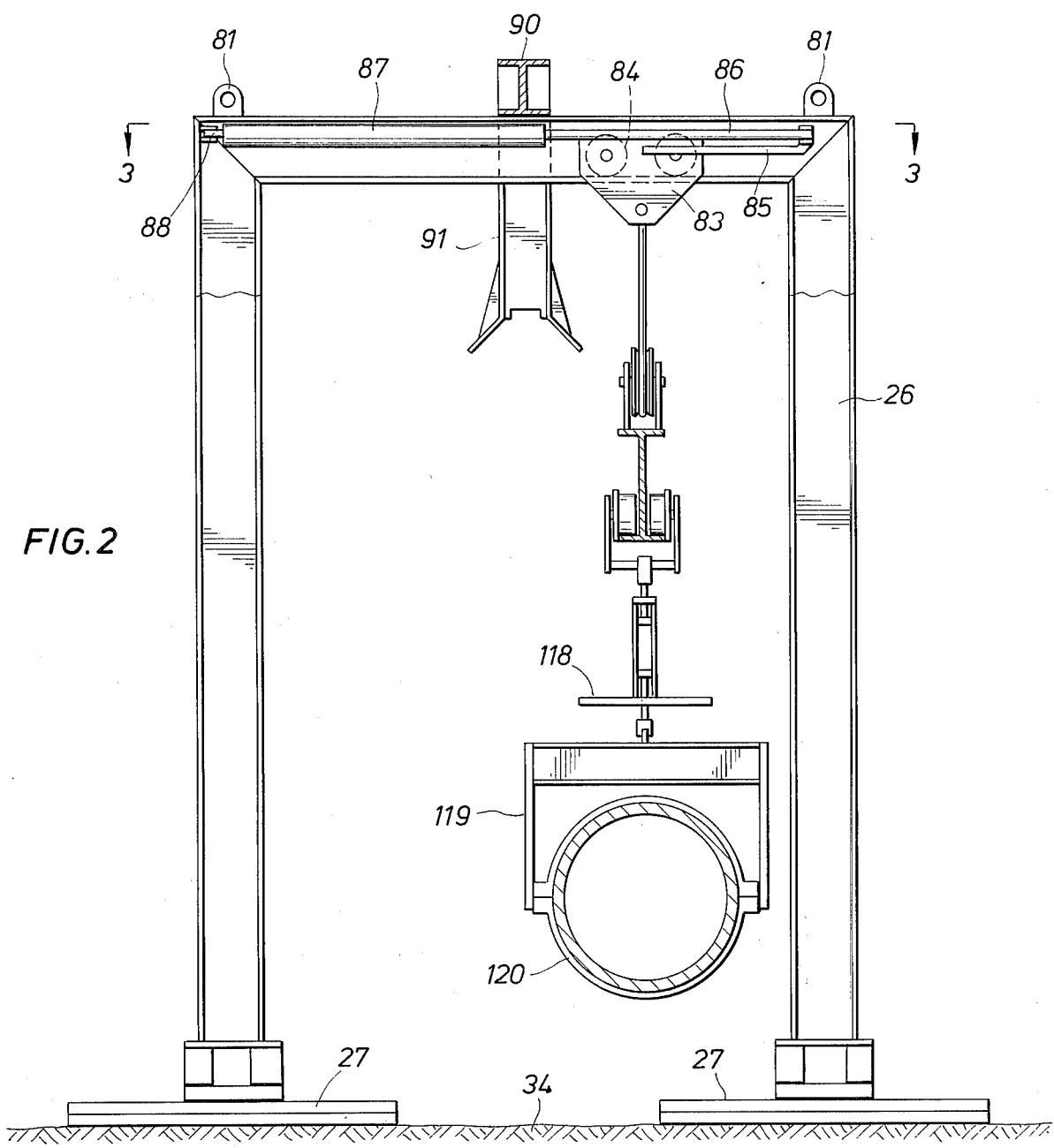
FIG. 2 is an elevation view of a portion of the apparatus for mounting the pipe coupling over the end of the pipe as shown in FIG. 1.

Referring now to the drawings, the numerals 11 and 12 are used to generally designate substantially identical pipe lifting and alignment frames which are shown respectively supporting off the seabed pipes 13 and 14. The particular configuration of frames 11 and 12 form no part of this invention, but are shown for the purpose of providing a teaching as to how the pipe ends which are to be interconnected may be supported and manipulated in carrying out the invention claimed herein. It is to be understood that pipes 13 and 14 may be two separate pipes which are to be joined to complete a pipeline or may be an original pipeline which has been severed so that a repair part or portion may be inserted. In any event, the terminal ends of pipes 13 and 14 are axially spaced apart and are to be interconnected for fluid flow purposes or the like.

The end of pipe 13 is suspended in cantilevered fashion by alignment frame 11 and has partially mounted thereover female ball coupling member 17. Similarly, the end of pipe 14 is supported in cantilevered fashion by frame 12 and has mounted thereover male ball coupling member 18. It is to be understood that coupling members 17 and 18 are of the hydraulically actuated type which are arranged for interconnection for fluid flow therethrough and which are also hydraulically actuated to grip and seal the respective pipes over which the same are mounted. Couplings of the aforesaid type are generally taught in U.S. Pat. No. 3,874,706.

Coupling member 17 is provided with and has attached thereto a pair of hydraulic rams 20, each of which is spaced on opposite sides thereof and both of which are connected to a hydraulically opened and closed pipeclamp 21, the latter being arranged for clamping about pipe 13 and subsequently releasing as desired. Hence, by manipulation of rams 20 and clamp 21, coupling member 17 may be moved axially on pipe 13 once coupling member 17 is placed thereover. Similarly, coupling member 18 has a pair of rams 23 which are similarly connected to a hydraulically actuated clamp (not shown) for engaging pipe 14 so that coupling member 18 may be similarly moved axially on pipe 14, once coupling member 18 is mounted thereover.

Apparatus for mounting coupling member 17 and 18 over the respective pipes are generally designated by the numeral 25 and include an inverted U-shaped frame 26, each leg of which is attached to a footing 27 for support on the seabed, as will be explained hereinafter.

In order to make a connection between pipes 13 and 14 it is usually necessary to bring the same into sufficient alignment such that the axes thereof intersect. To accomplish this purpose, alignment frames 11 and 12 are lowered to the positions shown by means of cable (not shown) attached to pickups 30 with the other end of the cable being manipulated from above. Referring in particular to FIG. 1, certain details of construction and operation of frame 12 will be described. It is to be understood, however, that frame 11 is substantially identical thereto and, hence, no separate detailed description will be given of alignment frame 11. Frame 12 is formed with a pair of vertically extending spaced I-beams 31, which together form a vertically extending runway therebetween and in which is mounted guide block (not shown) for vertical movement therein. The lower end of beams 31 are attached to an appropriately sized footing 33, usually of massive proportions, for support and stability on seabottom 34. The left side of frame 12 has another pair of vertically extending I-beams 37 which form therebetween the vertical runway in which is mounted another guide block (not shown) for vertical movement therein. The lower end of beams 37 are connected to another footing 39.

The top ends of beams 31 and 37 are joined by a pair of cross I-beams 41 which are similarly spaced a small distance apart for support of certain working apparatus therebetween. Beams 41 have pivotally mounted therebetween, near the ends thereof, a pair of hydraulic ram cylinders 42 which extend upwardly from beams 41 and each of which has downwardly extending piston rods 43 which are pivotally connected at the lower ends thereof to transverse beams 45. Hence, by application of hydraulic fluid pressure to opposite ends of ram cylinders 42, beams 45 may be raised and lowered thereby.

Beams have supported thereon laterally movable carriage means in the form of skid 60 which is supported by the upper surfaces of beams 45. Skid 60 is arranged to be moved laterally in either direction depending upon the application of hydraulic fluid to the appropriate end of a hydraulic cylinder assembly (not shown).

Means for connecting pipe 14 to skid 60 conveniently take the form of a flexible strap 62 which is passed beneath pipe 14 prior to the initial lifting operating and is connected at one end to a pair of adjustable links 64, the opposite ends of which are connected to the top portion of skid 60 by pin 65. The other end of strap 62 is connected to the lower end of piston rod (not shown) which is arranged for operation by hydraulic piston (not shown) supported by frame 73 mounted on skid 60.

Once strap 62 is secured at both ends, then the pipe 14 is raised relative to runway beams 45 by application of hydraulic fluid. With the pipe 14 thus held, it may be raised additionally by operation of rams 42.

In operation of frame 12, it is initially lowered from a support vessel by having a cable attached to pickup 30 and thereafter further lowered to the subsea position straddling pipe 14. Thereafter, by application of hydraulic fluid to cylinders 42, runway beams 45 are lowered such that strap 62 can readily be passed underneath pipe 14 with the ends thereof connected as described above. By applying hydraulic fluid to cylinders 42 to cause piston rods 43 to retract, runway beams 45 can be raised and, hence, pipe 14 therewith. By applying hydraulic fluid to hydraulic cylinder means (not shown) lateral movement of skid 60 and pipe 14 relative to beams 45 can be effected. Preferably, a hydraulic fluid power source 76 is fixed to frame 12 to provide the hydraulic fluid to the cylinders via conduits and controls (not shown).

Accordingly, by a diver operating frames 11 and 12 in the manner just described with respect to frame 12, pipes 13 and 14 can be lifted and moved laterally as well as being raised and lowered until the axes thereof are intersecting. In order to facilitate the passage of coupling members thereover, it may be desirable to misalign the two pipes sufficiently to permit the overshooting of the coupling members prior to the movement of the pipes to the position of having the axes thereof intersect.

Figure 3:
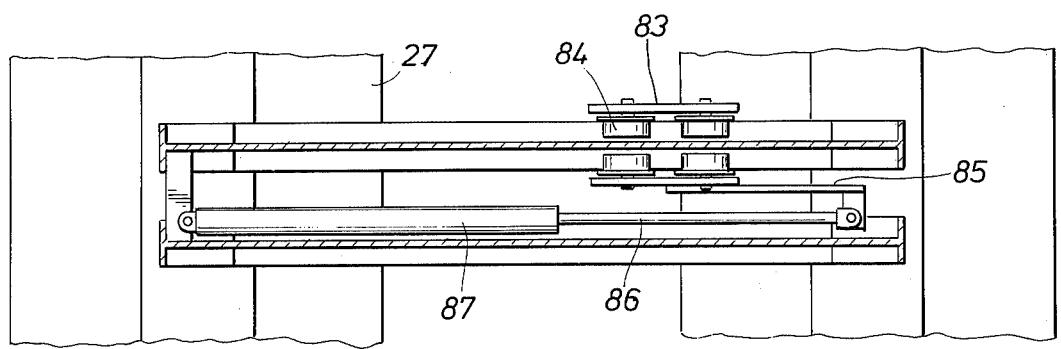
FIG. 3 is a top plan view, partially in section, taken generally along line 3—3 in FIG. 2.
Figure 4:
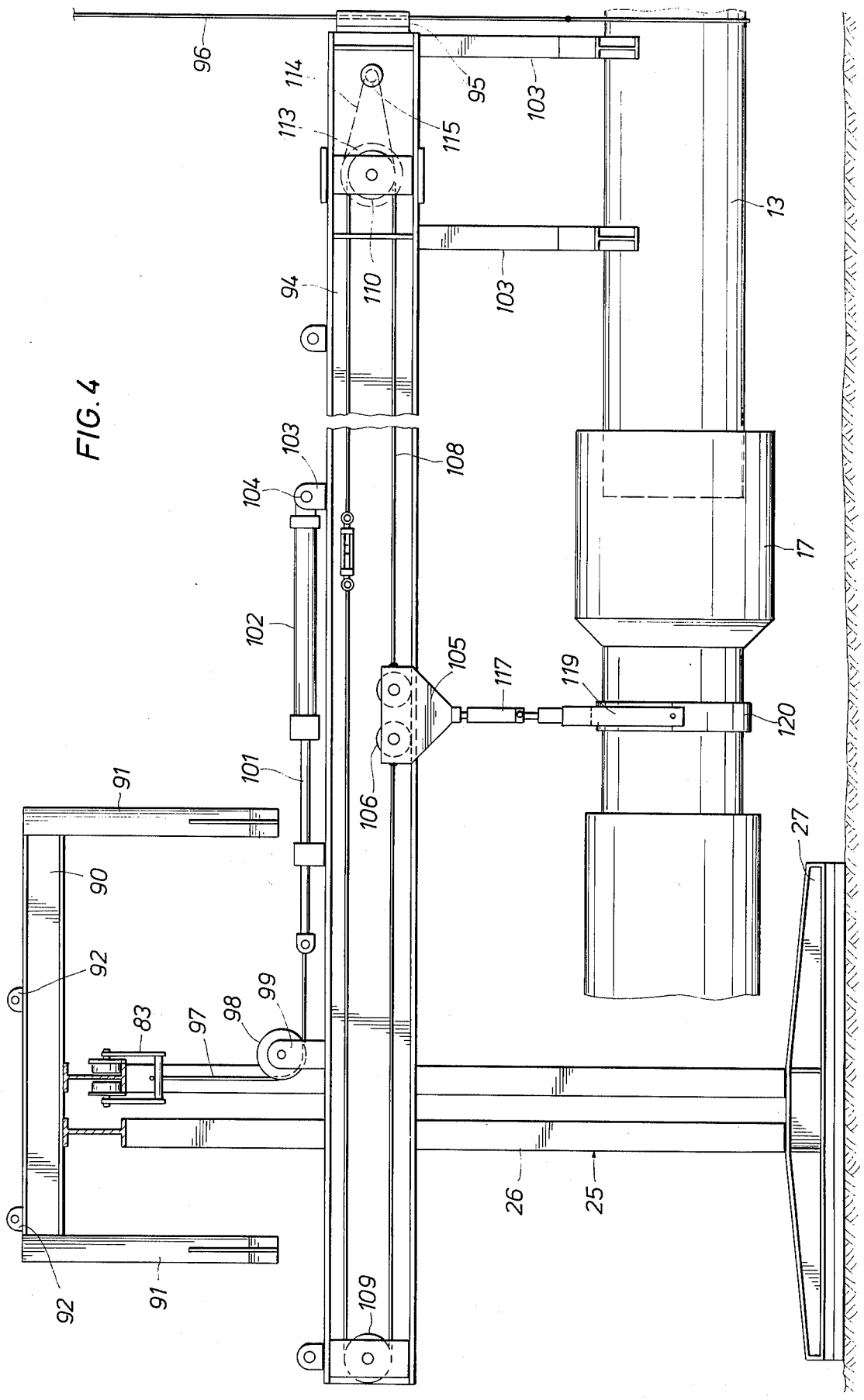
FIG. 4 is a side elevation view of the apparatus shown in FIG. 2, which is utilized for mounting the coupling member over the end of a pipe.

Apparatus and method for mounting a coupling member over the end of one of the aforesaid pipes which in the subject matter of this invention will now be described. More particularly, the aforesaid coupling mounting apparatus identified by the numeral 25 will be described. This apparatus includes the double I-beams inverted U-shaped frame 26 previously identified, the lower ends of which each have large area footings 27 attached therewith for support on seabottom 34. The top end of frame 26 has a pair of lifting eyes 81 attached therewith for manipulating and handling. In addition, the upper end of frame 26 supports a transversely moving trolley 83 which has a plurality of wheels 84 arranged to run on the bottom flange portion of the upper frame end, as shown in FIG. 3 and 4. Trolley 83 has attached thereto connecting arm 85 which extends generally horizontally, with the other end thereof being attached to piston rod 86, which in turn is connected to a piston (not shown) mounted in hydraulic cylinder 87, the other end of which is attached to the frame as by pin 88. Hence, upon application of hydraulic fluid pressure to an appropriate end of cylinder 87, piston rod 86 can be either extended or retracted to thereby selectively move trolley 83 laterally along the top end of frame 26.

Frame 26 also has rigidly attached therewith a generally transversely extending rest beam 90, each end of which has attached thereto and depending therefrom generally inverted Y-shaped guide arms 91, the purpose of which will be explained hereinafter. Rest beam 90 may also have conveniently attached therewith a pair of lifting eyes 92 for engagement with a cable to facilitate raising and lowering thereof in the body of water.

Coupling mounting apparatus 25 also includes support means in the form of main support beam 94, which is generally of I configuration in cross-section, one end of which has attached therewith guide tube 95 which is shown having passing therethrough guideline 96 which is looped around pipe 13 and extends upwardly therefrom to the surface. The other end of support beam 94 is connected to frame 26 by means of cable 97, one end of which is attached to trolley 83 and which is trained over pulley 98 rotationally mounted between lugs 99 ragidly attached to the upper side of beam 94. Cable 97 in turn is connected to piston rod 101 which in turn is connected to a piston (not shown) mounted in hydraulic cylinder 102, the opposite end of which is connected to lugs 103 by pin 104. Hence, upon application of hydraulic fluid to an appropriate end of cylinder 102, piston rod 101 can be either extended or retracted to thereby selectively lower or raise support beam 94 relative to trolley 83 and beam 90.

The opposite end of support beam 94 has attached therewith and depending downwardly therefrom a pair of axially spaced apart inverted Y-shaped alignment arms 103, which when both are maneuvered into proper position with pipe 13—i.e. the crotch of both Y-shaped arms 103 being in firm contact with pipe 13, align support beam 94 with pipe 13 and space the same a predetermined parallel distance therefrom; such maneuvering of beam 94 being effected by a diver operating hydraulic cylinders 102 and 87.

Support beam 94 has mounted thereon a carriage means in the form of trolley 105 which is supported on the lower flanges thereof by a plurality of wheels 106, such that trolley 105 may freely move longitudinally thereon.

Power means are provided for moving trolley 105 longitudinally on support beam 84, and these means take the form of a cable 108 attached on each end of trolley 105 and trained over pulley 109 mounted in the left end of beam 94, as seen in FIG. 5, and over pulley 110 mounted in the right end of beam 94, and having intermediately thereof spring loaded turnbuckle 111 to maintain a constant predetermined tension on cable 108. It is to be understood that pulley 110 is a driven pulley, being driven through sprocket gear 113 by drive chain 114 trained over pinion drive gear 115 which is arranged to be driven by an appropriate reversible air or hydraulic motor or the like (not shown). Hence, by operation of drive gear 115, trolley 104 may be moved longitudinally on support beam. Trolley 105 is arranged to support coupling member 17 through turn turnbuckle 117, the lower end of which has transversely extending handling bar 118 and also has connected therewith coupling cradle 119, which in turn is provided with clamp 120, which is arranged for clamping about the center of gravity of coupling member 17. With clamp 120 mounted on coupling member 17 at the center of gravity, coupling member 17 can be supported by a single connection, as shown, and easily manipulated thereby.

Preparatory to operation of coupling mounting apparatus 25, alignment frames 11 and 12 are initially installed and operated to raise pipes 13 and 14 to the cantilevered support position generally shown in FIG. 1. In the event that the axial spacing between pipes 13 and 14 was not sufficient to permit the oversliding of coupling members 17 and 18 thereover, then the pipes 13 and 14 would be moved laterally a sufficient distance to permit such overshooting as will be described hereinafter, after which the pipes 13 and 14 can be brought back into generally axial alignment, at least with the central axes thereof intersecting, to accomplish the final interconnection of coupling members 17 and 18.

With pipes 13 and 14 supported as aforesaid, guideline 96 is lowered from the sea surface and looped about pipe 13 in the manner shown in FIGS. 1 and 5. Above the surface of the water, coupling member 17 is engaged by clamp 120 at the center of gravity and turn buckle 117 is adjusted to space the top of coupling member 17 the correct distance below support beam 94 such that when support beam 94 is brought into substantially parallel alignment with the axis of pipe 13, coupling member 17 will be supported substantially coaxially therewith. Hence, operation of turnbuckle 117 permits the use of this apparatus for pipe couplings of various diameter.

Additionally, hydraulic fluid is applied to cylinder 102 such as to cause rod 101 to be withdrawn thereinto until support beam 94 is engaged with the lower ends of guide arms 91 and held securely in contact therewith. Thus held, support beam 94 is prevented from rotation away from the transverse alignment with frame 26.

Thus assembled, coupling mounting apparatus 25, having coupling member 17 supported therebelow, is lowered from the sea surface and guided by guideline 96 until footings 27 of frame 26 come to rest on seabottom 34. Thereafter, cable 97 is paid out by operation of cylinder 102 until both alignment arms 103 contact with pipe 13. In certain instances, it may be necessary to move the opposite end of support beam 94 transversely by operation of hydraulic cylinder 87 and trolley 83 to bring alignment arms 103 in alignment with pipe 13, such that support beam 94 is generally parallel with the central axis of pipe 13. Thus aligned, coupling member 17 will be substantially coaxially positioned with respect to the end of pipe 13. Thereafter, trolley 105 may be caused to move forwardly toward pipe 13 in the manner described above, such that coupling 17 is slid over the end of pipe 13 in the manner shown in FIG. 1. Minor adjustments in the relative position of coupling member 17 may be required to keep the same in coaxial alignment during the movement of the same over pipe 13 and this is accomplished by raising and/or lowering coupling 17 as described above or by moving the same laterally as described above.

Once coupling member 17 is mounted over pipe 13 a sufficient distance to support the same, clamp 120 may be removed from coupling member 17 and the coupling member 17 moved along on pipe 13 by operation of rams 20 and clamp 21, as previously described.

In certain instances, in order to reduce wave action on coupling member 17 during the installation phase, a removable line (not shown) may be tied between the end of coupling member 17 and support beam 94 to prevent ocean currents and the like from twisting or turning coupling member 17 relative to support beam 94. By having coupling member 17 supported at a single center of gravity point, as described above, only three controls are required to mount coupling member 17 over pipe 13, they being the controls which operate the cylinders 87 and 102 and the motor which drives cable 108. Hence, the diver has a minimum of controls to operate to successfully stab coupling member 17 over pipe 13. Once the overstabbing operation has been completed, then coupling mounting apparatus 25 may be removed and the operation repeated on the other coupling as, for example, coupling member 18 which is shown already mounted over pipe 14 in FIG. 1.

After both coupling members 17 and 18 are mounted over the respective pipe ends, as shown in FIG. 1, and the alignment apparatus 25 removed, then the center axis of pipes 13 and 14 are brought into intersecting relationship, if the same does not exist already in that relationship, by operation of frames 11 and 12. Thus positioned, coupling members 17 and 18 are thereafter interconnected as is well known to those skilled in the art and are actuated to sealing and gripping engagement with the respective pipes, thereby completing the interconnection of pipes 13 and 14, after which alignment frames 11 and 12 may be disengaged and removed from the seabottom, and with the pipes 13 and 14 once again resting upon the seabottom.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for mounting a coupling member over the end of a pipe in a subsea location where the pipe end is being supported in cantilevered fashion, the combination comprising:
    a frame arranged for lowering to and mounting generally adjacent said pipe end and supported on the seabottom;
    an elongated support beam connected to said frame and arranged to extend generally longitudinally over said pipe to support said coupling member therebelow;
    a carriage mounted on said support beam for longitudinal travel thereon;
    means for moving said carriage longitudinally along said support beam;
    means connected to said carriage means for holding said coupling member therebelow;
    a guide beam connected to said frame and extending generally transversely thereto;
    means connected to said guide beam for initially contacting and holding said support beam in generally parallel alignment therewith;
    alignment means connected to one end of said support beam for contacting said pipe and spacing said beam end a predetermined distance therefrom;
    means connected between said frame and said beam for raising and lowering said beam while said coupling member is supported thereby;
    and means for moving said support beam transversely relative to said frame and said pipe;
    whereby said frame and said coupling can be lowered in a body of water until said frame contacts said seabottom, and said coupling member can be brought into coaxial alignment with and passed over the end of said pipe by operation thereof.

2. The invention as claimed in claim 1 including:
    guide means connected to said pipe and to said support beam for guiding said frame to said subsea location during said lowering thereof.

3. The invention as claimed in claim 1 wherein:
    said means for moving said support beam transversely to said frame includes another carriage supported by said frame;
    and including power means for moving said other carriage on said frame.

4. The invention as claimed in claim 1, wherein:
    said means for holding said coupling member includes means for making a single weight bearing connection between said carriage mean and said coupling member, which connection is located at the balance point of said coupling member.

* * * * *